July 15, 1947.	D. McHENRY	2,423,842
PROTECTIVE COVERING FOR BONDED WIRE ELECTRIC STRAIN GAGES
Filed Feb. 28, 1946

INVENTOR.
DOUGLAS McHENRY
BY
ATTORNEY

Patented July 15, 1947

2,423,842

UNITED STATES PATENT OFFICE 2,423,842

PROTECTIVE COVERING FOR BONDED WIRE ELECTRIC STRAIN GAGES

Douglas McHenry, Denver, Colo., assignor to United States of America, as represented by the Secretary of the Interior Application February 28, 1946, Serial No. 650,933

2 Claims. (Cl. 201—63)

(Granted under the act of March 3, 1883, as amended April 30, 1928; 370 O. G. 757)

The invention described herein may be manufactured and used by the Government of the United States for governmental purposes, without the payment to me of any royalty thereon in accordance with the provisions of the act of April 30, 1928 (ch. 460, 45 Stat. L. 467).

My invention relates to a moisture-proof covering for bonded wire electric strain gages and particularly to a vulcanized rubber button for excluding moisture from a bonded wire strain gage of a type disclosed in U. S. Patent 2,292,549.

In the accompanying drawings which illustrate one embodiment of my invention:

Figure 1:
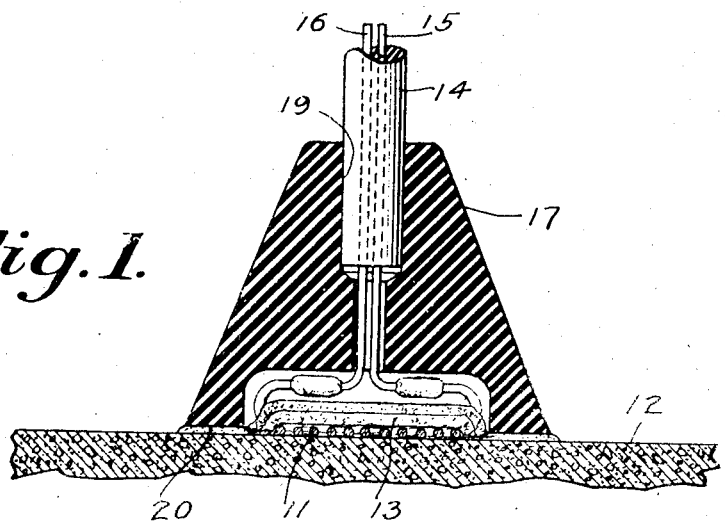
Figure 1 is a longitudinal section of one of my rubber buttons in operative position over a paper strain gage which has been cemented to a sample of a material to be strain tested.
Figure 2:
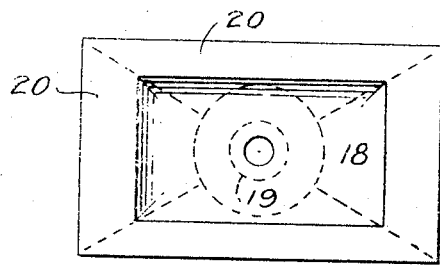
Figure 2 is a bottom plan view showing a recess for a gage.

In these drawings, 11 indicates a bonded-wire electric strain sensitive gage comprising a fine wire filament which is adhesively bonded to paper by means of Celluloid resin cement or the like while in an initially untaut condition. The gage 11 is shown as adhesively fastened to a specimen 12 of a material to be tested, which specimen may be concrete with or without reinforcement. The gage 11 is covered with a layer 13 of felt or the like. A conductor cable 14 enclosing two lead wires 15, 16 has been threaded through a vulcanized rubber button 17 having a suitable recess 18 for the strain gage and the felt covering therefor for avoiding direct contact of my button and the gage, and a hole 19 for the cable 14. A margin 20 of the button 17 forms a frame around the recess 18 of a width adequate for securely attaching the button 17 to a specimen.

Figure 3:
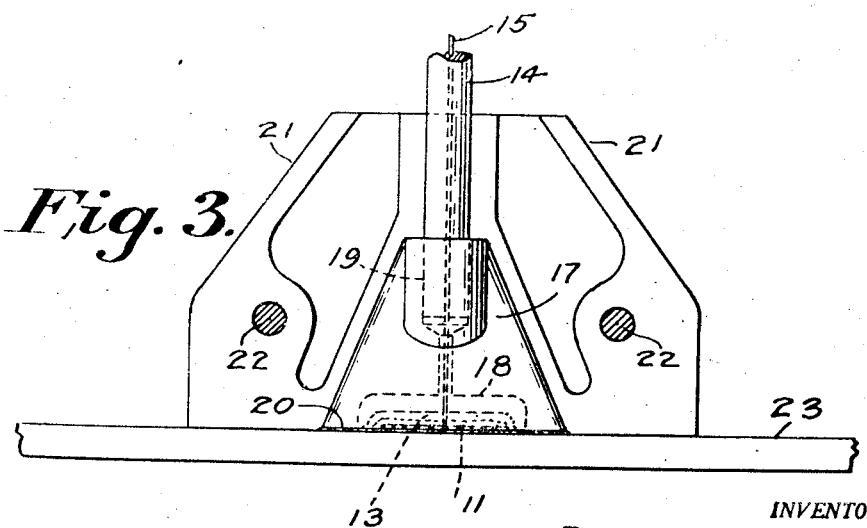
Figure 3 is an elevation of a section of one-half of a two-part mold when used for vulcanizing one of my buttons to a steel reinforcing bar when positioned over and operatively connected with a strain gage.

In Figure 3 is shown one-half 21 of a two-part mold which is bolted by bolts 22 and is used for making my button 17 of "neoprene" or other like vulcanizable compound, and is also used for vulcanizing the said button to a bar 23 of steel or other material.

The method of attaching my buttons to samples to be strain tested will vary with the particular requirements of the test. In the embodiment illustrated and described herein my button may be simply attached to a specimen by a waterproof elastic cement without heat or pressure and this elatsic cement will also seal the cable 14 in the button 17.

When used for measuring the strains in reinforcing steel, where the rubber-metal joint must withstand the rough treatment involved in concrete placing operations, a remarkably strong joint may be made by applying vulcanizing cement to the steel specimen, overlaying this with a thin layer of semi-cured "neoprene" and vulcanizing the joint under pressure by means of a mold 21 in which my buttons are made.

Another method of attaching the gage with my moisture-excluding button 17 to a reinforcing metal bar comprises grounding to the bar one of the two lead wires of the gage by inserting it into a 1/32 inch drill and there securing it by means of a wedge or by soldering. The strain gage is then cemented to the bar and allowed to dry. If the gage lacks an attached layer of protective felt, a piece of felt is trimmed to fit the gage and cemented thereto. The other insulated terminal lead wire is doubled back across this felt layer and is secured in this position by a second layer of felt cemented over it. The insulated cable 14 is then wrapped in a thin layer of semi-cured "neoprene" and inserted in the hole 19, bending the bare end of the wire therein to lie flat against the top of the cavity, and soldering it to a lead wire of the gage. The button is then either cemented or vulcanized to the specimen to form a moisture-proof joint.

My rubber housing provides a means for maintaining the required accuracy of the electrical resistance measurements with strain gages by keeping these gages completely dry during use, even in the interior of concrete under water.

I have shown and described one embodiment of my invention, but it is to be understood that it is capable of many modifications. Changes, therefore, in the construction and arrangement may be made without departing from the spirit and scope of the invention as disclosed in the appended claims, in which it is my intention to claim all the novelty inherent therein as broadly as possible in view of the prior art.

What I claim is:

1. A protective button for an electric strain gage having a chamber to receive a strain gage and a passage connecting with said chamber to receive conductors to a strain gage, said button being of water-proof material and sealed to a specimen to be tested.

2. A method of attaching a protective covering for strain sensitive gages which includes the steps of forming a rubber button having a central opening to receive a terminal, applying a suitable adhesive to the contact face of the button and pressing said contact surface over a strain gage against a surface of a specimen to be tested.

DOUGLAS McHENRY.

REFERENCES CITED

The following references are of record in the file of this patent:

UNITED STATES PATENTS

| Number | Name | Date |
| --- | --- | --- |
| 2,036,458 | Carlson | Apr. 7, 1936 |
| 2,350,073 | Simmons | May 30, 1944 |
| 2,360,886 | Osterberg | Oct. 24, 1944 |